UNITED STATES PATENT OFFICE.

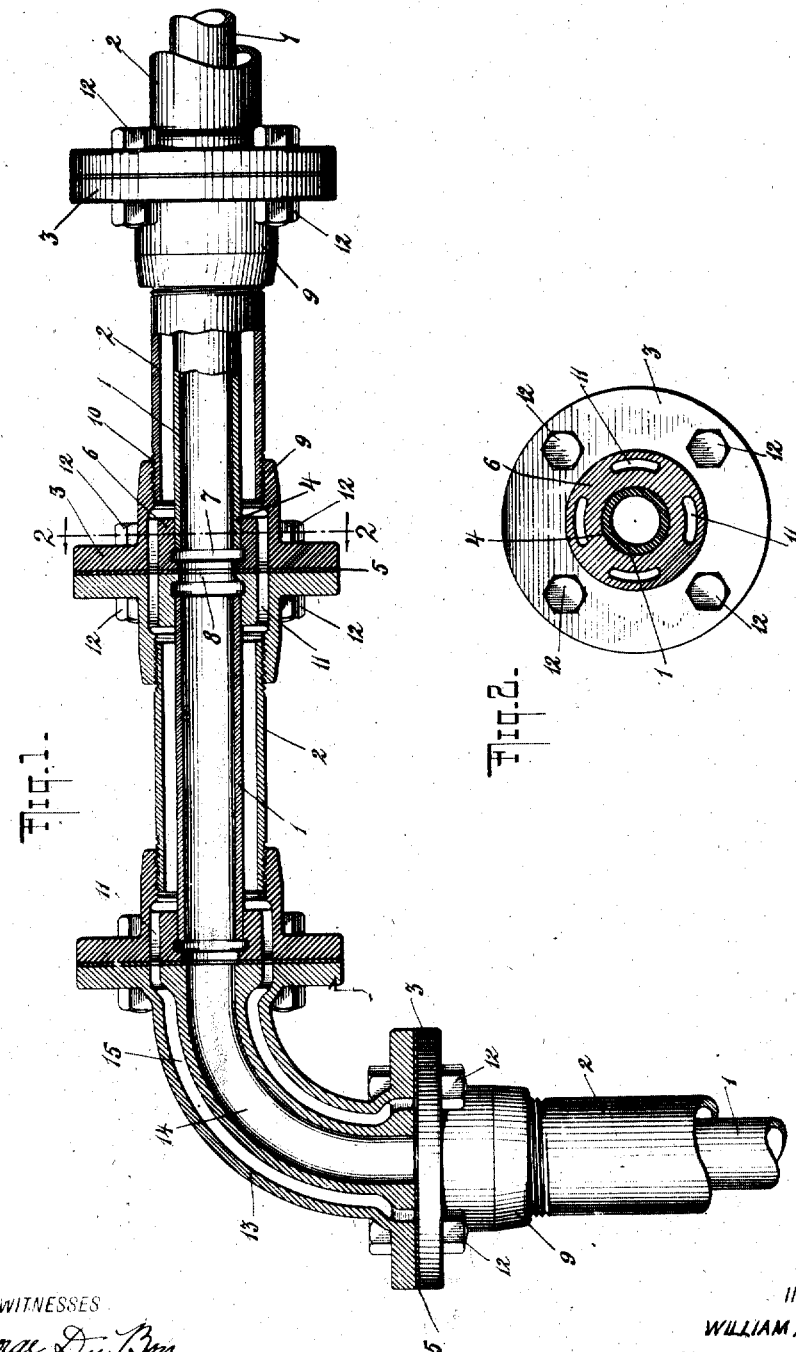

WILLIAM M. WHITE, OF HOBOKEN, NEW JERSEY.

PIPE-JOINT FOR DOUBLE PIPES.

1,217,543.  Specification of Letters Patent.  Patented Feb. 27, 1917.

Application filed January 14, 1914. Serial No. 812,018.

*To all whom it may concern:*

Be it known that I, WILLIAM M. WHITE, a citizen of the United States, and resident of Hoboken, county of Hudson, and State of New Jersey, have invented certain new and useful Improvements in Pipe-Joints for Double Pipes, of which the following is a specification.

My invention relates to improved pipe joints adapted for connecting two concentric pipes for use in refrigerating apparatus or the like where it is desirable that the liquid to be cooled shall be brought as closely as possible into contact with the pipe containing the cooling fluid. This relation is best obtained by the concentric arrangements of the pipes in which the cooling fluid is preferably circulated through the inner tube while the fluid to be cooled circulates through the annular channel formed between the inner and the outer tube. The greater difficulty encountered in this construction is to satisfactorily seal the joints between the pipes so as to have each conduit continuous and without any leakage from one conduit to the other. The object of my invention is to accomplish these results by a simple pipe joint construction which at the same time will permit the double pipe system to be easily and cheaply installed.

I have illustrated one form of my invention in the accompanying drawings in which Figure 1 represents the double pipe construction partially in section and Fig. 2 represents a cross-section of one of the castings at 2—2 of Fig. 1.

Referring to the drawings 1 represents a section of the inner tube or pipe which may be of any required length, and 2 represents the corresponding outer pipe arranged concentric therewith so as to form an annular channel or conduit about the inner tube. In order to maintain the proper concentric relation of the tubes and at the same time produce continuous conduits of any length without leakage therebetween, I unite several lengths of pipes by means of joints or unions and elbows substantially as indicated in Fig. 1 of the drawings. The joint or union preferably comprises two substantially similar flanged castings 3 having a central hole 4 bored therethrough of a diameter slightly less than the outside diameter of the inner tube. The flange of the casting is flat on one side and may be turned or faced off, so that two such castings may be secured together with a gasket 5 therebetween, to form a complete union adjacent length of pipes. On the opposite side from the gasket face, the casting in the form shown, is provided with a central annular boss which is counterbored at 6 to receive and snugly fit the outside of the inner pipe. The bottom of this counterbore is preferably still further bored out to form an annular groove 7, which is adapted to facilitate the insertion and manipulation of a tool for expanding the end of the inner tube 1 and thereby produce an absolutely tight joint between the inner tube and the casting. As previously stated, the hole at 8 is preferably of less diameter than the outside diameter of the inner tube and may correspond substantially with the inside diameter thereof so that between this and the larger diameter of the counterbore 6 and the annular groove 7 there is produced a radial flange adapted to prevent the inner tube from slipping out of place while assembling, or until the inner pipe is secured in the casting by expanding the end thereof as previously explained. The central boss is still further counterbored at its outer end 9 and internally threaded at 10 to receive the externally threaded ends of the outer pipe 2 whereby a tight joint between this pipe and the casting is produced. To render the annular channel, formed between the two pipes, continuous from section to section, the casting is preferably provided with a plurality of segmental channels at 11, extending from the bottom of the threaded counterbore through the ledge between the two counterbores outside of the counterbore at 6 and through the gasket face of the casting (see Fig. 2), the gasket 5 being provided with corresponding openings. The flange of the casting is provided with suitable holes through which bolts 12 may be passed for securing adjacent sections together upon the interposed gasket, as indicated in the drawings.

In assembling the double pipe sections the inner tube is preferably cut to the length required and telescoped into the corresponding outer tube which has been properly threaded at each end, and then one of the castings 3 is screwed home, on each end of the outer tube, the radial flanges at 8 being adapted to prevent displacement of the inner tube. The length of the inner tube should preferably be such that the ends shall not extend beyond the annular grooves 7. Preferably, after the castings have been screwed on to the outer tube as described, a suitable tube is inserted and the ends of the inner tube are expanded to produce a tight joint so that there can be no leakage between the inner conduit and the annular channel between the two tubes. The double tube is made continuous by securing adjacent castings 3 together, with a gasket interposed, by means of the bolts 12, the arrangement being such that the channels 11 of one casting register with the corresponding channels of the adjacent casting, thus rendering the annular conduit continuous while the registry of the holes at 8 makes the inner tube conduit continuous.

For changing the direction of the pipes I provide a special elbow casting such as illustrated at 13 in Fig. 1. This is simply a doubled flanged casting, the faces of the flanges being at an angle of 90° or other suitable angle, as required. The tubular connection between the two flanges has a bore 14 corresponding with the bore of the inner tube which is surrounded by segmental channels 15 corresponding with the channels 11 of the castings 3.

Thus with my improved joint or union, I am enabled to produce a double pipe system in which the fluid in one conduit is in the closest possible relation to that in the other conduit without the possibility of leakage from one to the other when the several sections are properly secured together.

It will be understood that various modifications in the specific details of construction may be made without departing from the spirit and scope of my invention as set forth in the accompanying claim.

I claim:

In a pipe joint for double pipes, the combination with an inner pipe and a concentric outer pipe of a joint member consisting of a flange and an integral annular boss, the face of the member opposite said boss being in a plane at right angles to the axis of said boss, said member being provided with a hole axially through said boss, the boss being counterbored at two different diameters, the smaller counterbore being adapted to fit the inner tube, while the larger counterbore is internally threaded and adapted to receive the threaded end of the outer pipe, said member being provided with an annular recess to facilitate expanding the end of said inner pipe whereby a tight joint between the two is produced.

In testimony whereof, I have hereunto set my hand in the presence of two subscribing witnesses.

WILLIAM M. WHITE.

Witnesses:
JOHN A. FERGUSON,
FRED A. KLEIN.